United States Patent [19]
Takahashi

[11] Patent Number: 6,108,139
[45] Date of Patent: Aug. 22, 2000

[54] OPTICAL HEAD DEVICE AND METHOD OF INFORMATION REPRODUCTION USING THE SAME

[75] Inventor: Junichi Takahashi, Tokyo, Japan

[73] Assignee: NEC Corporation, Tokyo, Japan

[21] Appl. No.: 08/958,159

[22] Filed: Oct. 27, 1997

[30] Foreign Application Priority Data

Oct. 28, 1996 [JP] Japan ................................. 8-285568

[51] Int. Cl.[7] ............................................. G02B 3/02
[52] U.S. Cl. ................................... 359/719; 359/823
[58] Field of Search ......................... 369/44.14–44.24, 369/112; 359/719, 823, 824

[56] References Cited

U.S. PATENT DOCUMENTS

| 4,322,838 | 3/1982 | Neumann | 369/45 |
|---|---|---|---|
| 5,699,341 | 12/1997 | Sugi et al. | 369/112 |
| 5,754,513 | 5/1998 | Yagi et al. | 369/112 |

FOREIGN PATENT DOCUMENTS

| 63-8701 | 1/1988 | Japan . |
|---|---|---|
| 64-76011 | 3/1989 | Japan . |
| 2-183430 | 7/1990 | Japan . |
| 5-101398 | 4/1993 | Japan . |
| 5-151951 | 6/1993 | Japan . |
| 9-43510 | 2/1997 | Japan . |
| 10-3687 | 1/1998 | Japan . |
| 10-40566 | 2/1998 | Japan . |
| 10-49907 | 2/1998 | Japan . |

Primary Examiner—Georgia Epps
Assistant Examiner—Suzanne Letendre
Attorney, Agent, or Firm—Sughrue, Mion, Zinn, Macpeak & Seas, PLLC

[57] ABSTRACT

An optical head device including a light source for directing a laser beam to an optical disk, a collimator lens arranged between the light source and the optical disk, and an objective lens arranged between the collimator lens and the optical disk, a collimator lens actuator for moving the collimator lens along the optical axis of the laser beam in response to the thickness of the optical disk, and an objective lens actuator for moving the objective lens along the optical axis of the laser beam.

5 Claims, 6 Drawing Sheets

OPTICAL HEAD DEVICE AND METHOD OF INFORMATION REPRODUCTION USING THE SAME

FIELD OF THE INVENTION

The present invention relates to an optical head device for reproducing information from an optical disk to which the information is optically recorded and a method of information reproduction using the optical head device.

BACKGROUND OF THE INVENTION

As a high-density and large-capacity recording medium, a diversity of optical disks including digital audio disks, video disks, and CD-ROMs are widely used. Now a high-density and large-capacity digital video disk (DVD) having a capacity (4.7 GB) seventh times more than a CD-ROM (with a memory capacity of 640 MB) is already commercially available. In optical memory technology underlying such disks, information is recorded and reproduced using a laser beam L which is focused by an objective lens 109 to a definition on the order of several micrometers as shown in FIG. 5. In information reproduction, the laser beam L is directed to an optical disk 103, and the reflected laser beam L is detected by an optical sensor 117 via a beam splitter 115. Shown further in FIG. 5 are a light source 105 and a diffraction grating 113.

In such an optical information recording and reproduction apparatus, the diameter of a small spot projected on the optical disk should be as small as possible to achieve a high-density and large-capacity goal. The size of the spot on the optical disk or spot definition is determined by the wavelength of the laser beam and the numerical aperture of the objective lens. To reduce the diameter of the spot on the optical disk 103, design efforts are made to shorten the wavelength of the laser beam L and to increase the numerical aperture of the objective lens.

To meet a high-density requirement imposed on the optical disk, the wavelength of the laser beam L is shortened, and the numerical aperture of the objective lens is increased, and the diameter of the spot is actually reduced. On the other hand, focal depth becomes shallow, degrading tilt characteristics. More particularly, reproduction performance in reproducing information is not reliably maintained due to the mechanical inclination of the optical disk with respect to the objective lens (warp) and the runout of a spindle motor (a displacement from a plane perpendicular to the axis of rotation).

To resolve the above problem, thinning the thickness of the optical disk may be contemplated. In a high-density optical disk, the problem is resolved by thinning the thickness of the optical disk and by implementing an optimum wavelength of the laser wavelength and an optimum numerical number of the objective lens in design. If the optical head device having the optimum design adapted to a thin optical disk is used with optical disks of a conventional thickness, a problem will arise. When a spot of the laser beam is projected onto the optical disk, a spherical aberration takes place due to the differences in the thickness of the optical disk, and highly reliable information reproduction cannot be performed.

FIG. 6 shows the relationship between an objective lens and the thickness of an optical disk. As shown in FIG. 6($a$), for example, the objective lens is designed to be adapted to a thin optical disk 103A. A spot subject to diffraction limited is produced on a storage layer 103$a$ of the optical disk 103A.

Referring to FIG. 6($b$), an objective lens 109 adapted to a thin optical disk is used with a thick optical disk 103B. Unlike the case shown in FIG. 6($a$), a spherical aberration takes place due to the difference in thickness of the optical disk 103B, and the intended spot diameter cannot be achieved. Reliable reproduction of the recorded information is rendered impossible.

One of the solutions to this problem is to vary the aperture of an objective lens. As aperture varying means, a liquid-crystal display element is used. More particularly, aperture varying means is installed upstream of the objective lens of the optical head device and an optical sensor is also provided. Depending on the thickness of the optical disk, the diameter of the laser beam incident on the objective lens is varied by the aperture varying means. Since the diameter of the laser beam is merely varied in such a method, aberration correction to the objective lens is not sufficient enough, leaving recording and reproduction characteristics unimproved.

SUMMARY OF THE INVENTION

Accordingly, it is an object of the present invention to provide an optical head device that reproduces information from disks of a plurality of types having different thicknesses.

To achieve the above object, the optical head of the present invention comprises a light source for directing a laser beam to an optical disk, a collimator lens arranged between the light source and the optical disk, an objective lens arranged between the collimator lens and the optical disk, a collimator lens actuator for moving the collimator lens along the optical axis of the laser beam in response to the thickness of the optical disk, and an objective lens actuator for moving the objective lens along the optical axis of the laser beam.

In the above optical head device, the positions of the collimator lens, objective lens and light source are optimally designed to match a disk having a particular thickness. Information reproduction is properly performed on the optical disk having such a particular thickness, because aberration is controlled.

When reproduction is performed from the storage layer of an optical disk having a different thickness, an aberration takes place if the positions of the collimator lens, objective lens and light source remain fixed, and a spot cannot be properly formed on the storage layer of the optical disk. Proper information reproduction is thus rendered impossible. For this reason, to perform focus control, the objective lens is moved along the optical axis of the laser beam. To control an aberration created, the collimator lens is moved along the optical axis of the laser beam. In this way one optical head device set reproduces properly information from an optical disk even if it has a different thickness.

DETAILED DESCRIPTION OF THE PREFERRED EMBODIMENTS

Figure 1:
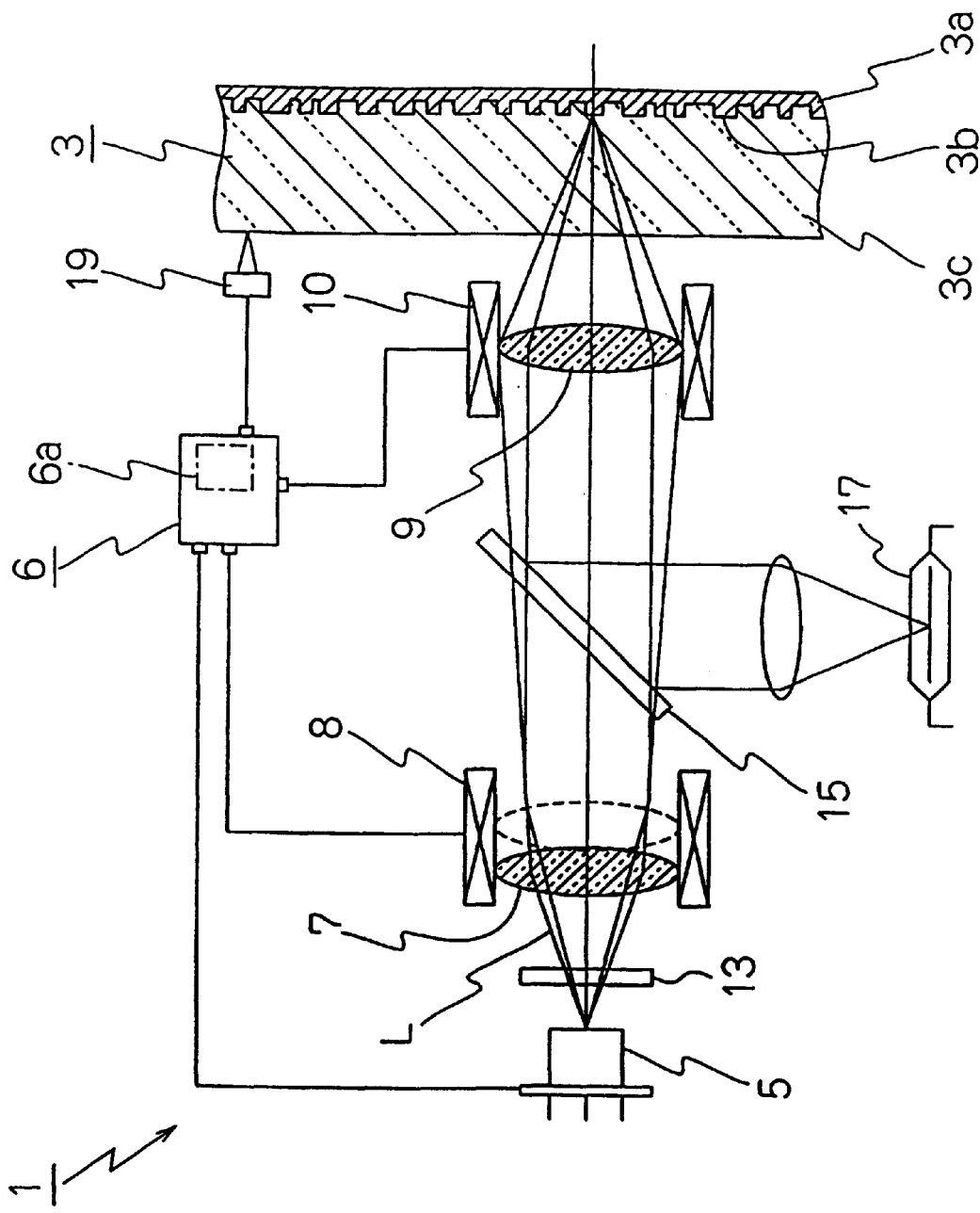
FIG. 1 is a diagrammatic view showing a first embodiment of the optical head device of the present invention.

Referring now to the drawings, the preferred embodiments of the present invention are now discussed.

A first embodiment of the present invention is described referring to FIG. 1. FIG. 1 is a block diagram showing the optical system of the optical head device of the present invention.

As shown, an optical head device 1 comprises a light source 5 for directing a laser beam L to an optical disk 3, a collimator lens 7 arranged between the light source 5 and the optical disk 3, and an objective lens 9 arranged between the collimator lens 7 and the optical disk 3. The optical head device 1 further comprises a collimator lens actuator 8 for moving the collimator lens 7 along the optical axis of the laser beam L and an objective lens actuator 10 for moving the objective lens 9 along the optical axis of the laser beam L.

The optical disk 3 contains a storage layer 3a having a storage bit 3b formed thereon and a transparent substrate 3c entirely covering the storage layer 3a. The optical disk 3 is typically a circular disk, only part of which is shown in cross section in FIG. 1. In the present invention, the difference in thickness among optical disks is chiefly attributed to the difference in thicknesses of the transparent substrate 3c.

The light source 5, constructed of a semiconductor laser, emits a single wavelength (coherent) laser beam L in response to a command from a controller 6. To reproduce information from a high-density optical disk 3, the diameter of the spot of the laser beam L has to be particularly small. In such a case, a shorter wavelength laser light is employed. A diffraction grating 13 is arranged in the vicinity of the light source 5.

The collimator lens 7 is arranged to the laser exit side of the light source and collimates the laser beam L into a substantially parallel beam. As shown in FIG. 1, the collimator lens 7 is a convex lens and collimates the laser beam L as a diverging light beam into a substantially parallel beam. The collimator lens 7 is supported by the collimator lens actuator 8. The collimator lens actuator 8 has a function of moving the collimator lens 7 along the optical axis of the laser beam L. The amount of travel and direction of travel of the collimator lens 7 are controlled by the controller 6 in response to the thickness of the optical disk 3.

The objective lens 9, arranged between the collimator lens 7 and the optical disk 3, has a function of converging the laser beam L onto the storage layer 3a of the optical disk 3. More particularly, the objective lens 9 is supported by the objective lens actuator 10, and moves along the optical axis of the laser beam L in response to a command from the controller 6. The objective lens 9 is a convex lens in this embodiment.

A beam splitter 15 is arranged between the collimator lens and the objective lens. The beam splitter 15 is constituted by a half-mirror. The beam splitter 15 permits the laser beam L emitted from the light source 5 to pass therethrough toward the optical disk while reflecting the laser beam L reflected from the optical disk toward an optical sensor 17.

Referring to FIG. 1, the general operation of the optical head device 1 thus constructed is discussed. The basic functions of the optical head device 1 are now discussed. The optical head device 1 has several basic functions. Its first function is a light converging function for focusing the laser beam from the light source into a spot up to diffraction limit. In this light converging function, the light converging lens is used to converge the laser beam from the light source onto the optical disk to form the spot thereon. A second function is focus control of the spot. The focus control is performed by moving the objective lens along the optical axis of the laser light. A third function is a signal detection. The signal detection is to detect a storage bit formed on the surface of a CD-ROM or the like, and to reproduced it as information. A fourth function is tracking control of the spot. The tracking control is to move the objective lens to make the spot continuously follow an intended track.

To reproduce the information recorded on the optical disk 3, the laser beam L emitted from the light source 5 is collimated into a substantially parallel beam through the collimator lens 7. The laser beam L in parallel form is converged by the objective lens 9. The converged laser beam L is directed to the storage layer 3a of the optical disk 3, forming a spot on the optical disk 3. The optical disk 3 may be warped during manufacture and a spindle motor for rotating the optical disk may suffer eccentricity. In its rotation, the optical disk is subject to a runout (a displacement from a plane perpendicular to the axis of the disk) and an eccentricity (a radial displacement). Mechanical errors arising from these may cause the converged spot to a diameter of 1 micrometer or so to be off a storage truck. The objective lens 9 is supported by the objective lens actuator 10 movable in two axes for focus control and tracking control, and acts to precisely align the spot to the storage truck.

The focus control is now discussed. The spot is controlled in response to the runout of the optical disk 3 (the disk displacement from a plane perpendicular to the axis of rotation). More particularly, the laser beam L reflected from the optical disk 3 is directed back to the objective lens 9. The beam splitter 15 causes astigmatism, guiding the laser beam L to the optical sensor 17, which detects an focus error signal. The objective lens 9 is moved along the optical axis of the laser beam L in response to the focus error signal, thereby performing focus control.

The tracking control for compensating for the runout of the optical disk 3 is now discussed. The laser beam L emitted from the light source 5 is transmitted through the diffraction grating 13, and forms three beams for picking up a tracking error signal. These three beams contain a principal beam at center and negative and positive primary beams on both sides. The three beams formed through the diffraction grating 13 are directed to the optical disk 3. The diffraction grating 13 is positioned such that the primary beams on both sides of the principal beam impinge both sides of a storage track. By comparing the signals of the primary beams, a tracking error is detected. In this way, when the spot on the optical disk 3 is deviated from a target track, the tracking error signal in response to the runout of the optical disk 3 is derived, and a control signal canceling out the tracking error signal is applied to the lens actuator. The tracking control is thus performed.

Aberration correction as a feature of this embodiment is discussed in conjunction with the relationship between the objective lens and the collimator lens.

Referring to FIG. 1, when the collimator lens 7 and objective lens 9 are optimally designed to the thickness of the optical disk 3, an optimum spot is formed on the storage layer 3a of the optical disk 3. When an optical disk 3 having a different thickness, the focal length of the objective lens 9 is changed by a distance determined by the thickness of the optical disk and the laser beam L. The distance of change is modified by the focus control with the objective lens actuator 10.

Since the objective lens 9 is designed to be adapted to the optical disk 3 having a particular thickness, an optical disk 3 having a different thickness presents a substantial deviation from an assumed design condition. A spherical aberration thus takes place, and the spot having a desired diameter cannot be obtained on the optical disk having the different thickness. For example, optical disks having different thickness are typically a combination of CD-ROM and DVD with CD-ROM being 1.2 mm thick and DVD being 0.6 mm thick.

Figure 2:
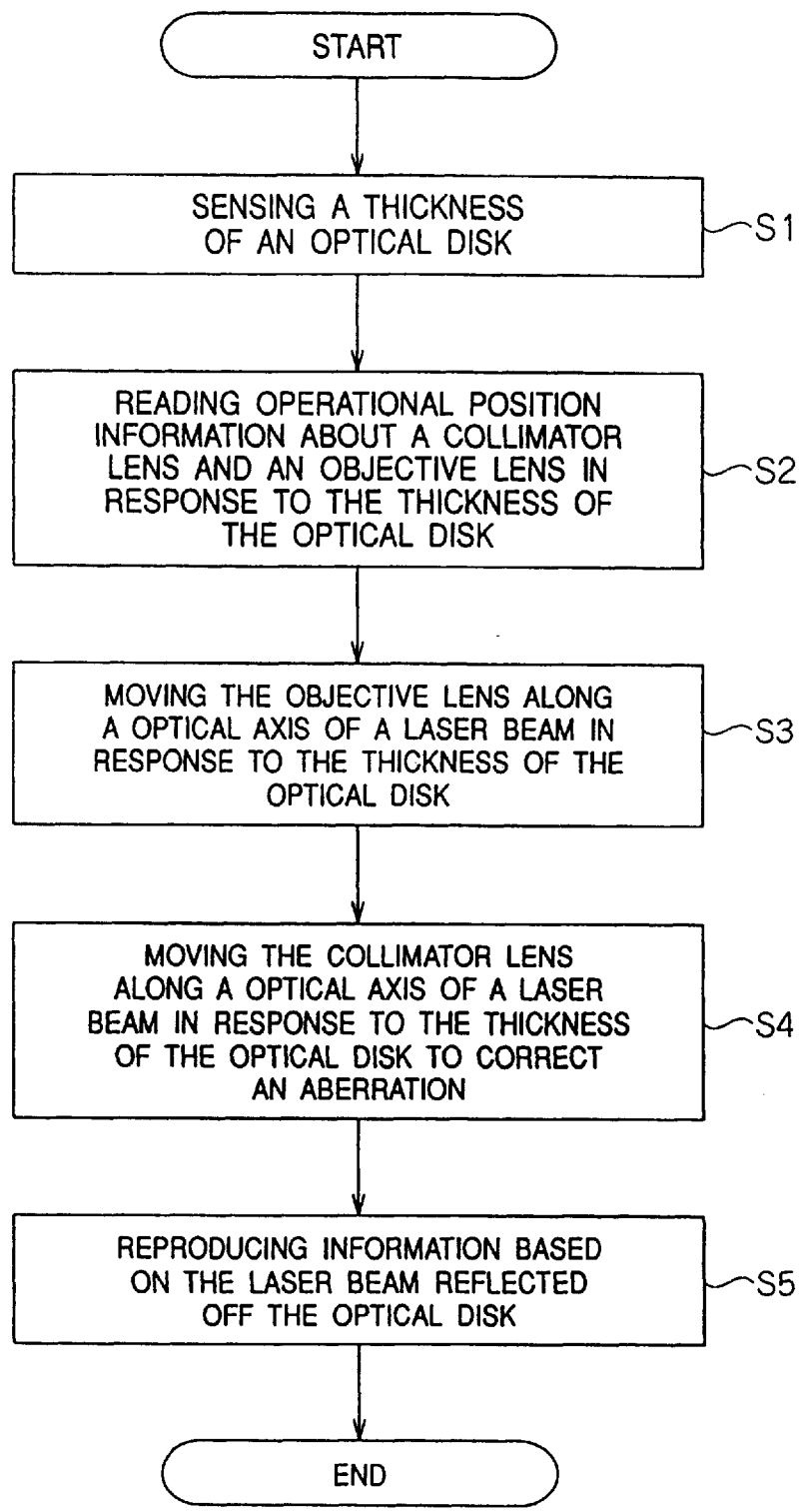
FIG. 2 is a flow diagram showing an information reproduction method using the optical head device of the present invention.

According to the present invention, the collimator lens actuator 8 moves the collimator lens 7 along the optical axis of the laser beam L (as represented in a dotted line as shown in FIG. 1) until the spherical aberration is minimized. More particularly, an optical thickness sensor means 19 senses the thickness of the optical disk 3 (step 1) as illustrated in FIG. 2. The objective lens 9 is moved to a position in compliance with the thickness of the optical disk 3 (step 2). The position information about the collimator lens 7 and objective lens 9 may be beforehand stored in the memory 6a in the controller 6, and is then read (step 21). The collimator lens 7 is moved along the optical axis of the laser beam L so that the spherical aberration is minimized (step S3). The optical system including the collimator lens 7 and objective lens 9 is optimally set up in this way. The light source 5 directs the laser beam L to the optical disk 3 to reproduce the information from the optical disk 3 (step S4). It is also noted that the same effect is achieved by moving the light source 5.

Figure 3:
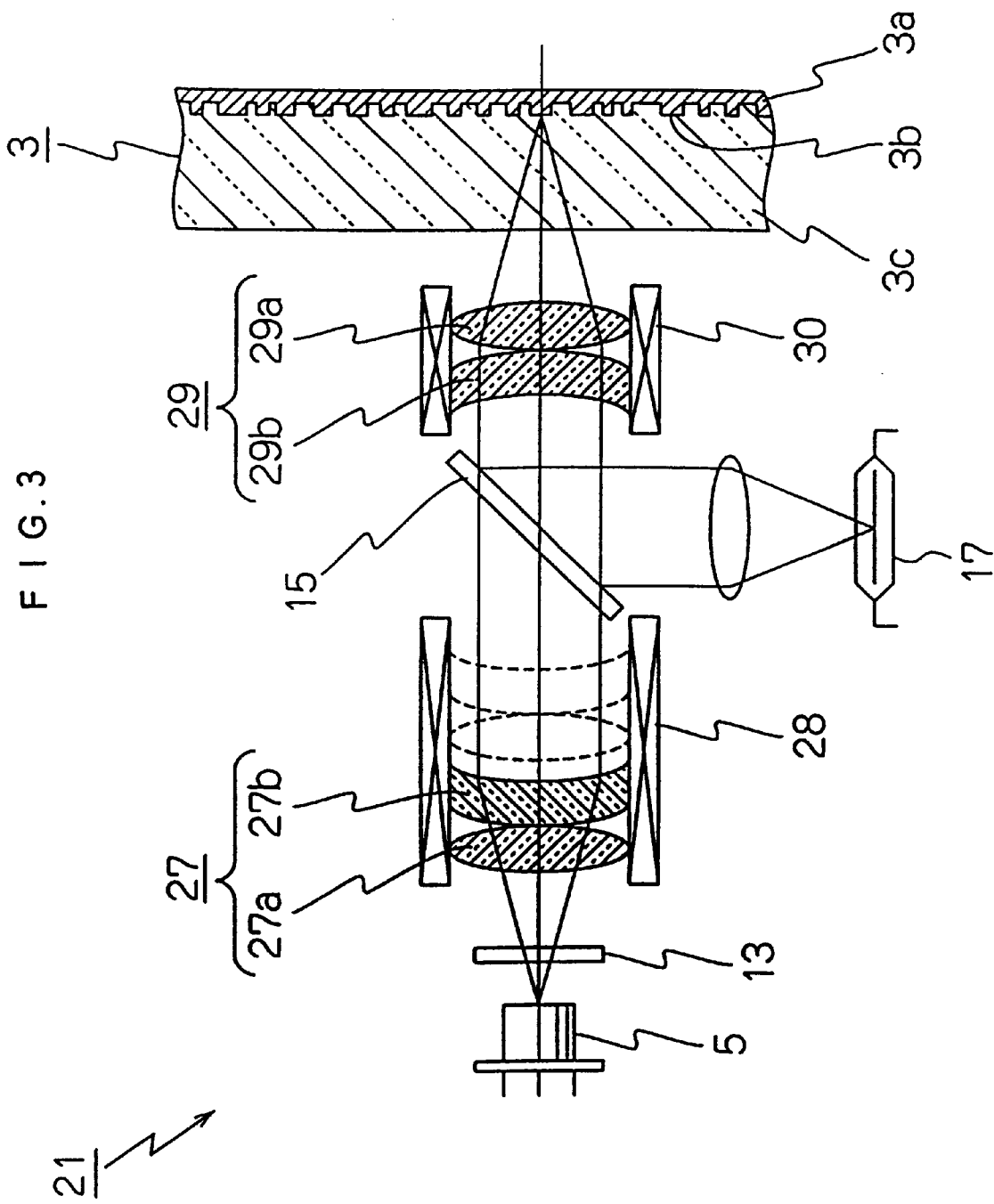
FIG. 3 is a diagrammatic view showing a second embodiment of the optical head device of the present invention.

A second embodiment of the present invention is now discussed referring to FIG. 3.

An optical head device 21 comprises major elements identical to those described in conjunction with the first embodiment. In this embodiment, however, the structures of a collimator lens 27 and an objective lens 29 are different from those in the first embodiment. The collimator lens 27 is constructed of a convex lens 27a and a meniscus lens 27b, and the objective lens 29 is constructed of a convex lens 29a and a meniscus lens 29b. In the collimator lens 27, the convex lens 27a is arranged to the side of the light source 5, and the meniscus lens 27b is arranged to the side of the optical disk 3. The meniscus lens 27b has its concave surface facing the side of the optical disk 3. In the objective lens 29, the convex lens 29a is arranged to the side of the optical disk 3 and the meniscus lens 29b is arranged to the side of the light source 5. The meniscus lens 29b has its concave surface facing the side of the light source 5.

The principle and method of reproducing information from the optical disk 3 remain unchanged from those in the first embodiment. In the optical head device 21, however, the convex lens 27a and the meniscus lens 27b constituting the collimator lens 27 are moved in unison to correct aberration. Referring to FIG. 3, aberration is further controlled by rendering mutually facing surfaces of the collimator lens 27 and the objective lens 29 concave.

Figure 4:
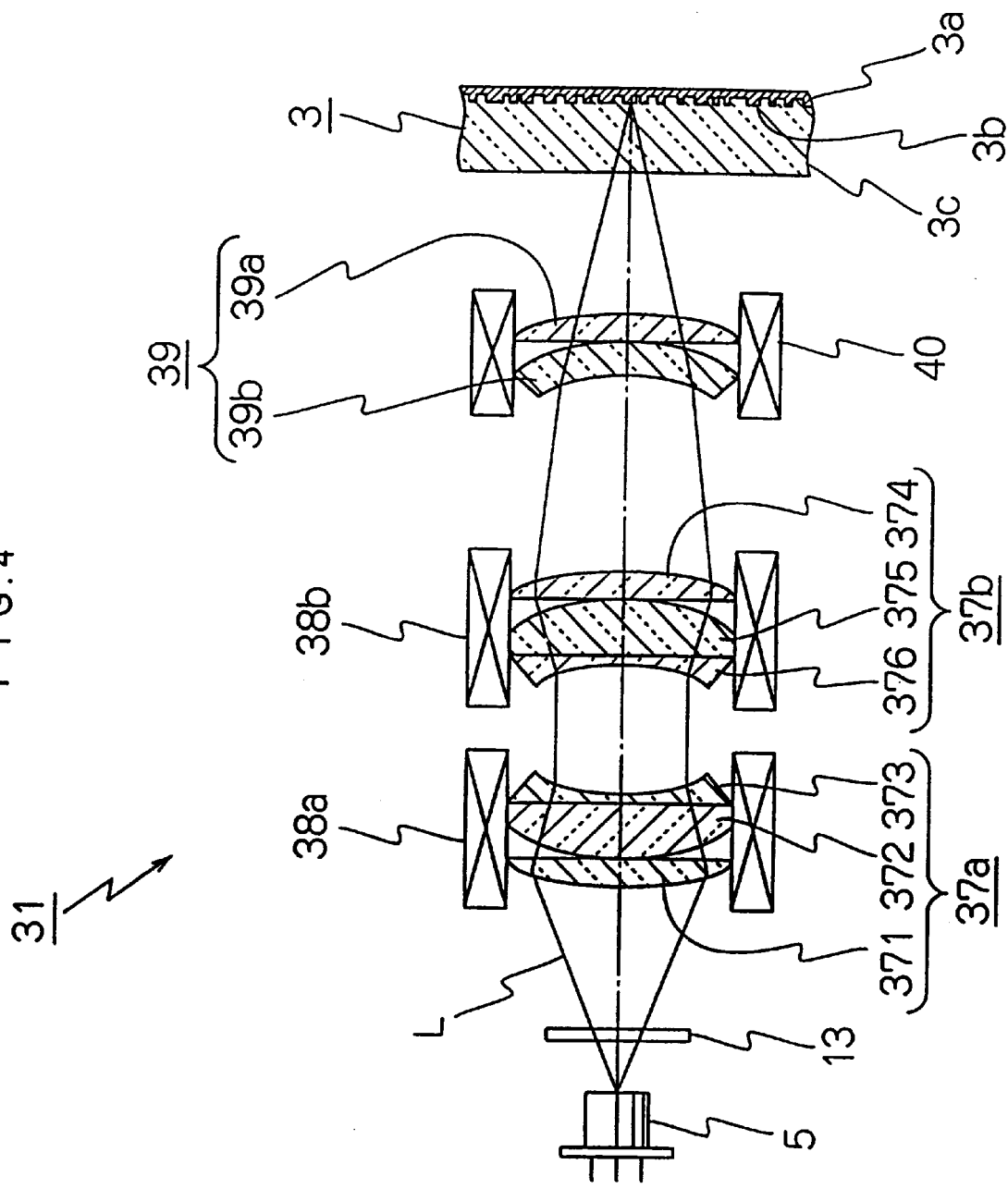
FIG. 4 is a diagrammatic view showing a third embodiment of the optical head device of the present invention.
Figure 5:
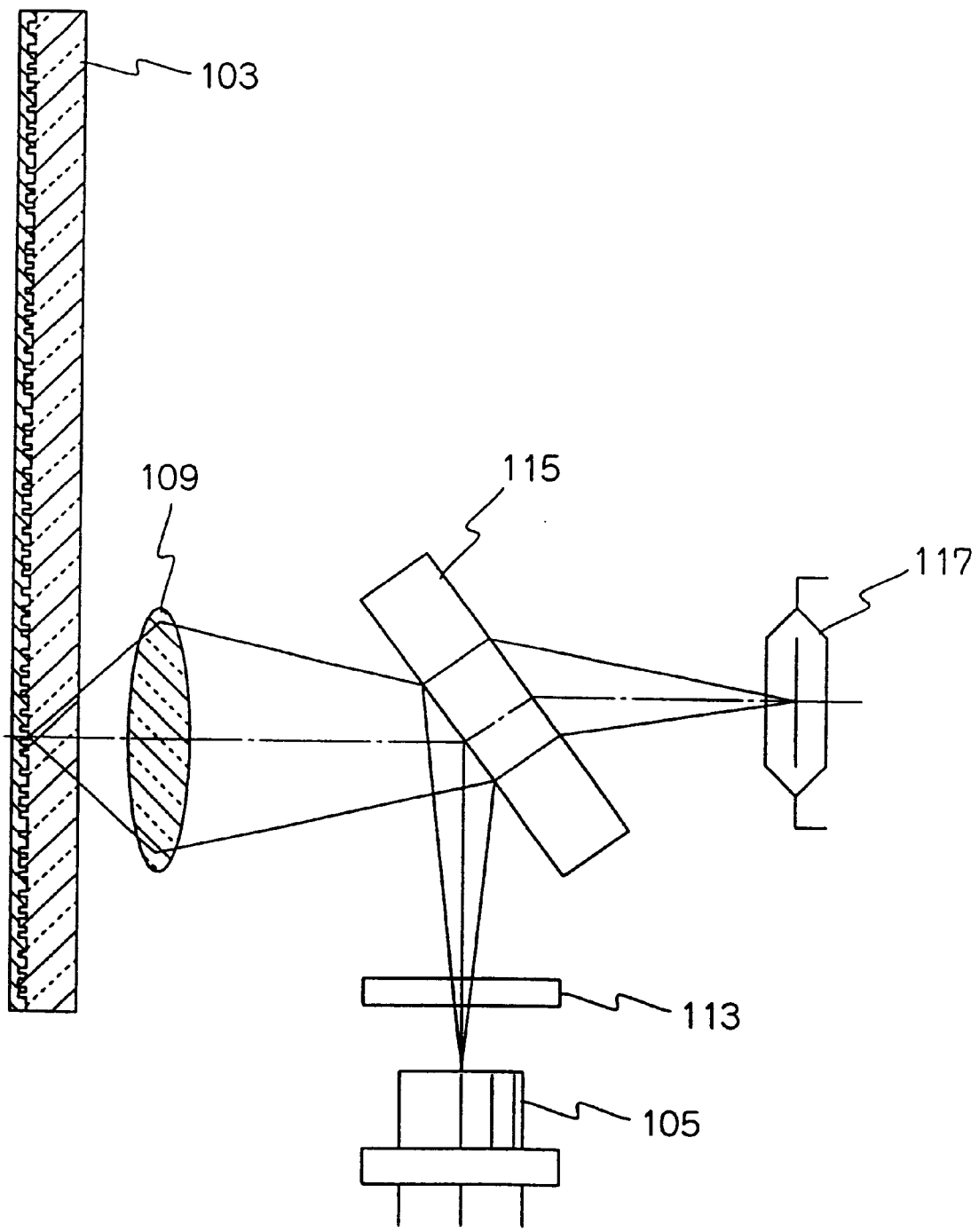
FIG. 5 is a diagrammatic view showing a conventional optical head device.
Figure 6A:
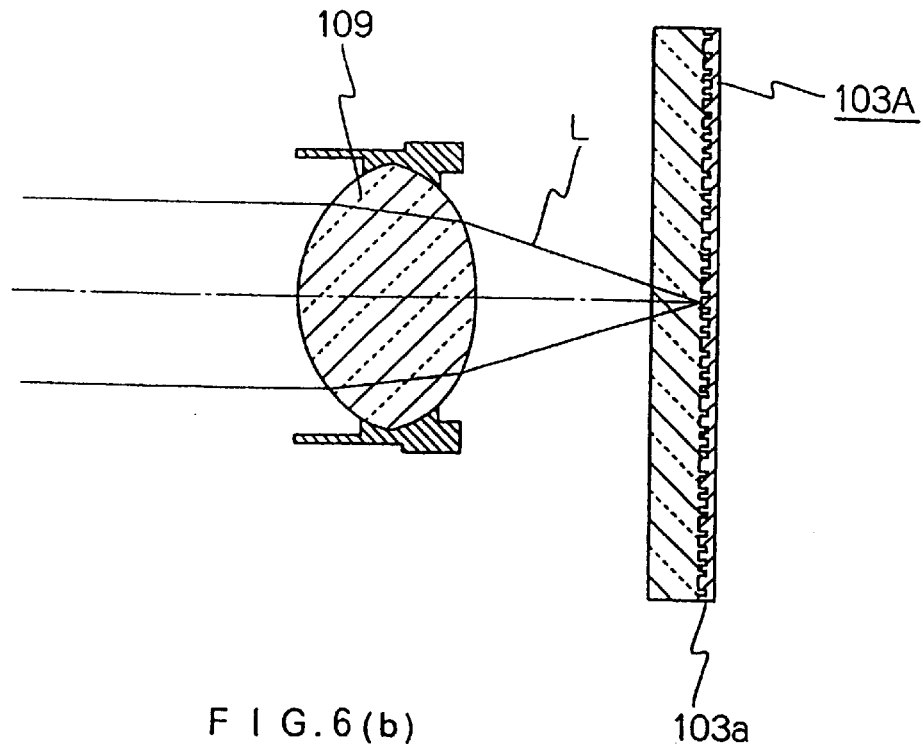
FIGS. 6$a$ and $b$ are a diagrammatic view showing another conventional optical head device.
Figure 6B:
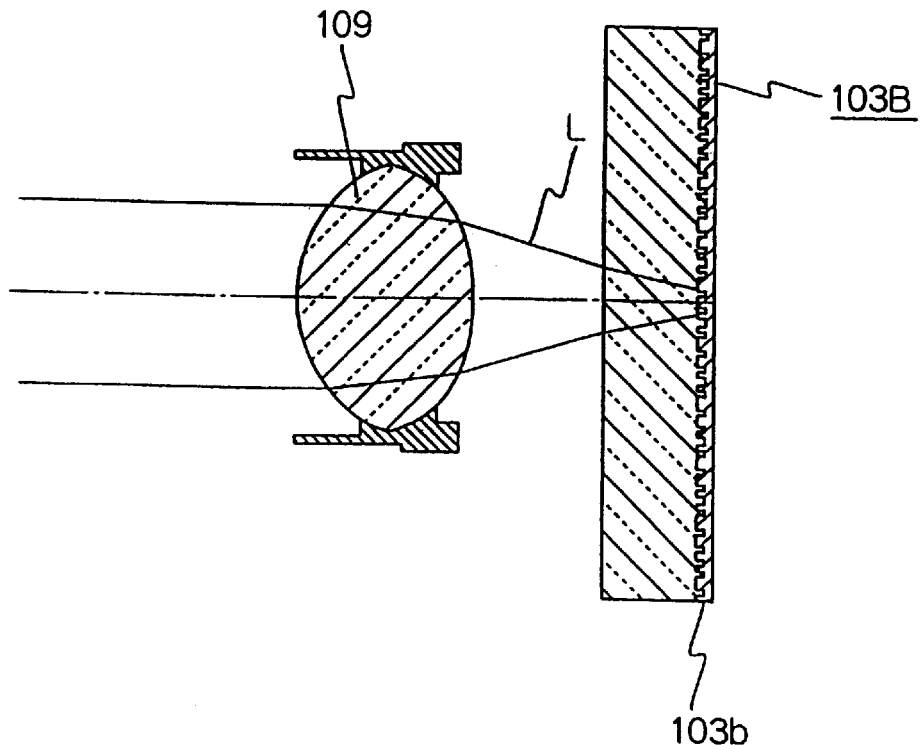

Referring to FIG. 4, a third embodiment of the present invention is now discussed. An optical head device 31 comprises the light source 5 for directing the laser beam L to the optical disk 3 and two units of collimator lenses 37a, 37b arranged between the light source 5 and the optical disk 3. Mutually facing surfaces of the first collimator lens unit 37a and the second collimator lens unit 37b are concave. The optical head device 31 further comprises an objective lens 39 arranged between the second collimator lens unit 37b and the optical disk 3, collimator lens actuators 38a, 38b for moving the first and second collimator lens units 37a, 37b respectively along the optical axis of the laser beam L in compliance with the thickness of the optical disk 3, and an objective lens actuator 40 for moving the objective lens 39 along the optical axis of the laser beam L in compliance with the thickness of the optical disk 3.

As shown in FIG. 4, each of the collimator lens units 37a, 37b is a multi-lens system. More particularly, the first collimator lens unit 37a is constructed of plano-convex lenses 371, 372 and a plano-concave lens 373 in that order farther from the side of the light source. The plano-convex lens 372 and the plano-concave lens 373 are arranged with their facing flat surfaces kept in contact, forming a double-Gauss lens. The second collimator lens unit 37b is constructed of three lenses 374, 375 and 376 in a similar fashion. The first collimator lens unit 37a and the second collimator lens unit 37b are arranged with their concave surfaces facing each other.

The collimator lens units 37a, 37b are supported by the collimator lens actuators 38a, 38b, respectively, and are movable along the optical axis of the laser beam. The controller for controlling the collimator lens actuators is omitted in FIG. 4.

The objective lens 39, arranged between the second collimator lens unit 37b and the optical disk, is constructed of a plano-convex lens 39a and a meniscus lens 39b. More particularly, the plano-convex lens 39a is arranged to the side of the optical disk 3 and the meniscus lens 39b is arranged to the side of the second collimator lens unit 37b. The meniscus lens 39b has its concave surface facing the second collimator lens unit 37b. The objective lens 39 is also movably supported by an objective lens actuator.

With the lens system thus constructed, the aberration due to differences in optical disk thickness is corrected, while an aberration caused by the movement of the objective lens 39 in the focus control is also corrected.

When a standard-density optical disk is played in the optical head device designed to be adapted to a high-density optical disk, information reproduction is properly performed by moving the collimator lens of this embodiment with the collimator lens actuator or the like.

As described above, the optical head device of the present invention corrects spherical aberration due to differences in optical disk thickness inside the optical head device itself. Optical disks having different thicknesses are played on the optical head device. Since a thin optical disk assures a large tilt margin, a high aperture ratio of the objective lens is achieved.

The invention may be embodied in other specific forms without departing from the spirit or essential characteristic thereof. The present embodiments is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical head device for correcting an aberration arising from variations in the thickness of an optical disk, the optical head device comprising:

a light source for directing a laser beam to an optical disk;

a collimator lens arranged between the light source and the optical disk, wherein the collimator lens has a concave surface to the side of the optical disk;

an objective lens arranged between the collimator lens and the optical disk, wherein the objective lens has a concave surface to the side of the collimator lens;

a collimator lens actuator for moving the collimator lens along the optical axis of the laser beam in response to the thickness of the optical disk; and an objective lens actuator for moving the objective lens along the optical axis of the laser beam in response to the thickness of the optical disk.

2. An optical head device according to claim 1, wherein the collimator lens comprises a convex lens and a meniscus lens, wherein the convex lens is arranged to the side of the light source and the meniscus lens is arranged to the side of the optical disk; and the objective lens comprises a convex lens and a meniscus lens, wherein the convex lens is arranged to the side of the light source and the meniscus lens is arranged to the side of the optical disk.

3. An optical head device according to claim 2, wherein the convex lens and the meniscus lens in the collimator lens move in unison.

4. An optical head device for correcting an aberration arising from variations in the thickness of an optical disk, the optical head device comprising:

a light source for directing a laser beam to an optical disk;

two units of collimator lenses arranged between the light source and the optical disk, wherein mutually facing surfaces of the lens units are concave;

an objective lens arranged between one unit of the collimator lens units to the side of the optical disk and the optical disk;

a collimator lens actuator for moving the collimator lens units along the optical axis of the laser beam in response to the thickness of the optical disk; and an objective lens actuator for moving the objective lens along the optical axis of the laser beam in response to the thickness of the optical disk.

5. An optical head device according to claim 4, wherein a first one of the collimator lens units to the side of the light source comprises a convex lens and a meniscus lens, wherein the meniscus lens comprises a plano-convex lens and a plano-concave lens and wherein the convex lens is arranged to the side of the light source while the meniscus lens is arranged to the side of optical disk;

a second one of the collimator lens units to the side of the optical disk comprises a convex lens and a meniscus lens, wherein the meniscus lens comprises a plano-convex lens and a plano-concave lens and wherein the meniscus lens is arranged to the side of the light source while the convex lens is arranged to the side of the optical disk.

* * * * *